United States Patent [19]

Hawkins et al.

[11] 4,085,860

[45] Apr. 25, 1978

[54] THERMAL PROTECTION SYSTEM FOR FILAMENT WOUND PRESSURE VESSELS

[75] Inventors: Russell Olson Hawkins; James Francis Mallatt, both of Lincoln, Nebr.

[73] Assignee: Brunswick Corporation, Skokie, Ill.

[21] Appl. No.: 688,116

[22] Filed: May 20, 1976

[51] Int. Cl.² .............................................. B65D 25/00
[52] U.S. Cl. ................................................. 220/89 B
[58] Field of Search .............. 220/89 B; 228/201, 202; 164/98, 102

[56] References Cited

U.S. PATENT DOCUMENTS

| 1,211,173 | 1/1917 | King ................................... | 220/89 B |
| 2,049,771 | 8/1936 | Gwyn, Jr. .......................... | 164/98 X |
| 2,742,179 | 4/1956 | Livers ................................ | 220/89 B |

OTHER PUBLICATIONS

*Soldering Manual,* American Welding Society; New York, N.Y., 1959, pp. 15, 16, 53 and 54.

*Primary Examiner*—Donald G. Kelly
*Assistant Examiner*—K. J. Ramsey

*Attorney, Agent, or Firm*—John G. Heimovics

[57] ABSTRACT

Thermally actuated pressure relief is provided for lightweight filament or fiber wound pressure vessels. A pressure release device is provided for a filament or fiber wound pressure vessel which device contains an alloy insert which will soften and release the pressure in the vessel upon the device being subjected to a predetermined temperature range. The temperature range must be below the degradation temperatures of the pressure vessel and above the normal ambient use and storage temperatures of the vessel. The alloy in the pressure release device must be capable of taking the shear stress of the cyclical pressurization and depressurization of the vessel without failure, which shear stress would be both the mechanical shear between the alloy and the walls of the hole in the device, i.e., the adhesion between the alloy and the walls of the hole in the device, and the inner granular shear within the alloy so that the alloy will stay together under the normal use and storage pressure and temperature of the vessel. A method for manufacturing the pressure release device is included.

5 Claims, 5 Drawing Figures

THERMAL PROTECTION SYSTEM FOR FILAMENT WOUND PRESSURE VESSELS

BACKGROUND OF THE INVENTION

1. Field of the Invention

This invention relates to pressure relief devices for a pressure vessel and, in particular, to a thermally releasable alloy for use in a pressure release device in a fiber wound pressure vessel.

2. Description of the Prior Art

Pressure vessels for shipping liquids and gases under high pressure have generally been confined to metal, since metal has been recognized as the one material capable of withstanding the cyclical pressurizations and depressurizations of the vessel and to properly ventilate when the vessel is subjected to excessive temperatures.

Specifically, certain governmental agencies require that any vessel shipped in interstate commerce that contains fluids or gases under high pressure, must contain a pressure release device which will safely vent the fluids or gases in the event the vessel is subjected to excessive heat, such as might result from a fire caused by a train or truck wreck or the like.

The metal of the pressure vessel, being heat conductive, has made it possible to provide the vessel with a pressure relief valve such that when the pressure in the vessel reaches a certain value, the valve will release and permit the contents of the vessel to safely escape.

With the introduction and successful application of fiber wound pressure vessels, such as shown in U.S. Pat. Nos. 3,843,010 and 3,815,773, it is possible to manufacture pressure vessels capable of withstanding the cyclical pressurization and depressurization required by the governmental agencies with a vessel that is much lighter in weight. Heretofore, it has been impossible to obtain government agency approval for shipment in interstate commerce of the fiber wound vessels containing fluids or gases under pressure without attachment to expensive secondary electrical or pyrotechnic vent devices, because the pressure relief valves, of the type used in metal pressure vessels, would not function before the fiber wound vessel reached a degradation temperature, thereby permitting an explosive release of the fluids or gases. This was due, in large measure, to the fact that the fiber wound vessels would not conduct the heat from the fire sufficiently to build up adequate pressure within the vessel to release the pressure relief valve prior to rupture of the vessel.

SUMMARY OF THE INVENTION

It has been found that a thermally actuated pressure release valve can be provided for a fiber wound pressure vessel which will vent the pressurized contents of the vessel; upon the vessel, in the vicinity of the valve, receiving temperatures well below the degradation temperature of the vessel, but well above the normal operating temperatures of the vessel. That is, a metal valve member is threaded into the metal caps or bosses on either or both ends of the pressure vessel, which metal valve member contains a channel filled with a material such as an alloy, which material will withstand the normal cyclical pressurization and depressurization changes of the vessel, will continue to seal the contents of the vessel within the normal ambient temperatures of −65° to 200° F and yet will vent the contents of the vessel upon being subjected to temperatures in the 350° to 400° F range, which temperature range is below the degradation temperature of the fiber wound pressure vessel. The material in the channel in the relief valve must have mechanical shear and granular shear sufficient to operate within the parameters desired.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 3:
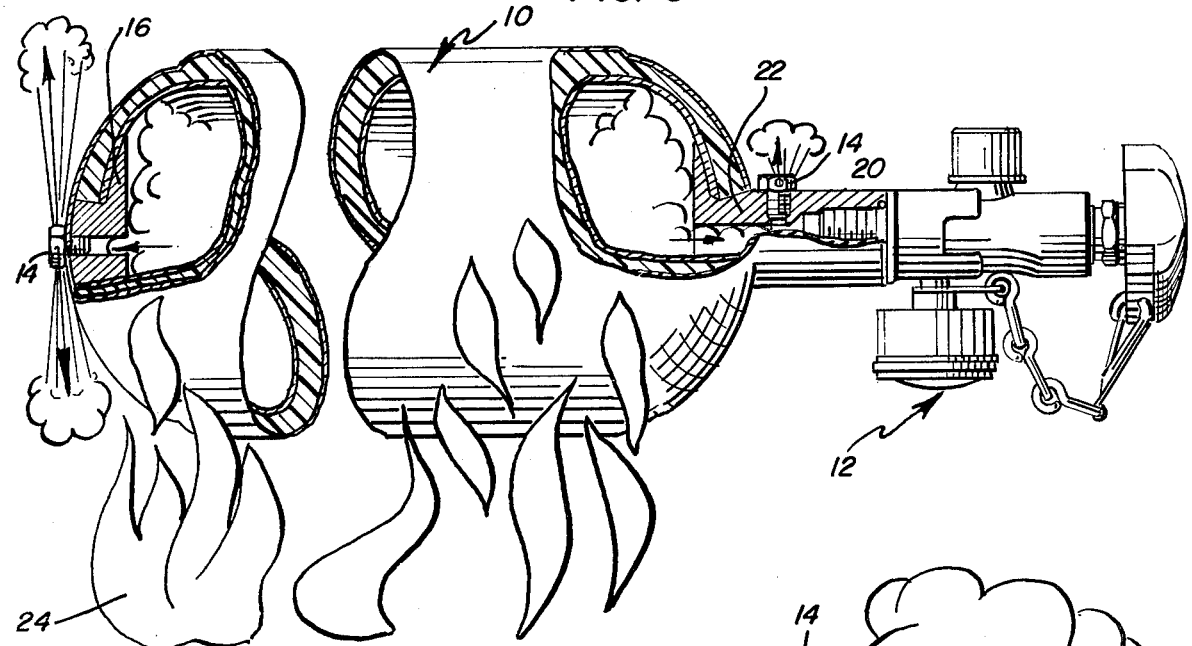
FIG. 3 is an elevational view of a fiber wound pressure vessel with parts broken away and in section showing pressure relief devices of our invention mounted in both ends of the pressure vessel.

Referring to the drawings, and in particular to FIG. 3, a pressure vessel 10 is illustrated and has a normal actuator mechanism 12 mounted on one end thereof, which mechanism is used to release the contents of the pressure vessel when desired. A thermally actuated pressure relief device or valve 14 is shown mounted in the metal cap or boss 16 forming the bottom of the pressure vessel 10. A second thermally actuated pressure relief valve 14 of identical construction is shown mounted in the neck 20 of a metal cap or boss 22 carried by the top portion of the pressure vessel 10. For illustration purposes, the vessel 10 is shown in a fire 24 with both thermally actuated relief valves 14 being shown releasing the contents of the vessel.

Figure 1:
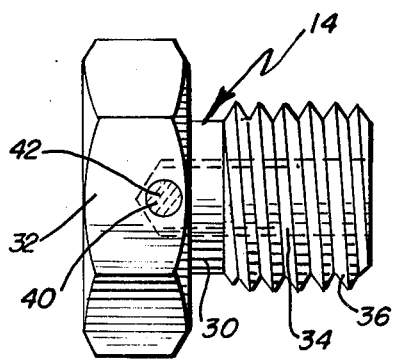
FIG. 1 is an elevational view, substantially enlarged, of a pressure relief valve showing our invention.
Figure 2:
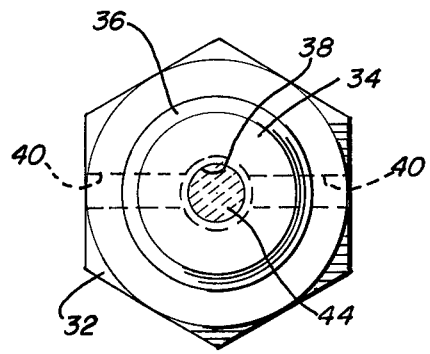
FIG. 2 is an end view of the valve of FIG. 1.
Figures 4, 5:
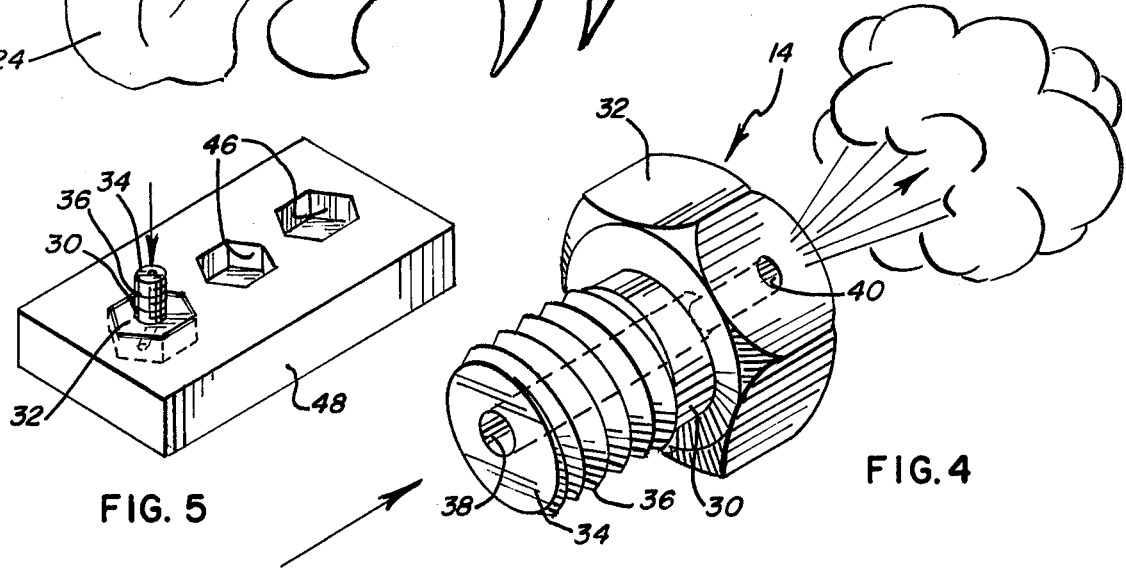
FIG. 4 is a perspective view of our pressure relief valve illustrating release of the fluids in a pressure vessel.
FIG. 5 is a perspective view of a plug holding fixture for use in manufacturing the valves.

The pressure relief valve 14, as shown in FIGS. 1, 2 and 4, has a body portion 30 which is comprised of a hexagonal head portion 32 and an extended shank portion 34. The shank 34 is threaded as at 36. In one preferred embodiment, the material of the body portion 30 is steel. The shank 34 is tapped from the outer end thereof to form an opening 38 which intersects a transversely extending drilled opening 40 running across the span of the head 32. The diameter of the opening 40 in the head 32 is approximately one-half the diameter of the tapped opening 38 in the shank 34.

The openings 38 and 40 in the valve 14 are filled with a slug 42 of an alloy which is bonded to the walls of the openings 38,40 in such a way as to withstand the mechanical shear at the parting line with the walls of the openings so that pressure on the end face 44 of the slug 42 of alloy facing into the pressure vessel 10 will not separate the slug 42 of alloy from the walls of the openings 38 and 40 and will not permit the pressure to be released between said slug 42 of alloy and the walls of the openings 38,40 in the body of the valve 14. The alloy making up the slug 42 must also have inner granular shear strength such that pressure on the slug 42 of alloy from within the container will not cause the particles making up the alloy to separate and permit the pressure in the vessel to escape.

The openings 38, 40 form a pressure relief channel in the body 30 of the valve 14 which is T-shaped with the two branches forming the head of the "T" exiting through opposite faces of the head 32 of the valve 14. The purpose of this is to permit the contents under pressure to vent out both sides of the valve 14 at the same time, thereby reducing or eliminating thrust on the end of the bottle.

Pressure vessels 10 of the type herein being used are composite structural housings defined by a metal liner substantially surrounded by a resin impregnated fiber or filament formed reinforcing layer. The pressure vessel 10 should be capable of withstanding repeated cyclical pressurization and depressurization. As previously mentioned, vessels of this type have been described and claimed in U.S. Pat. No. 3,815,773, assigned to the common assignee of the present application.

One known use of the present thermal relief valve is in firemen's back pack breathing systems where the pressure vessel must take at least 10,000 cycles of pressurization and depressurization. Fiber wound pressure vessels made to provide this required cyclic life and using one improved thermal relief valve, are very acceptable and, in addition, are light in weight, making it much easier for the firemen to carry these life support systems in complete safety.

Pressure vessels of the filament wound variety without our thermal relief valve, in a fire, will have the fiber glass resin tending to insulate the vessel and, accordingly, the temperature rise in the vessel is not as great as in a metal bottle. Due to the nature of the fiber glass resin, the vessel will start to degrade after the temperature reaches a certain level and will then explode. Due to the possible degradation and explosion of the bottle without our thermal relief valve, certain governmental agencies will not accept, for interstate shipment, such bottles loaded with fluids or gases under pressure.

In some instances, the fiber glass wound pressure vessels can have an intumescent coating over the fiber wound area to insulate said area to hold the degradation level above a certain level, i.e., approximately 350° F. The coating must be compatible with the fiber glass resin system, must be able to adhere to the fiber glass resin and must be capable of withstanding the cyclical pressurization and depressurization of the vessel. The coating also has sufficient scuff resistance so as to aid in protecting fibers of the bottle from damage.

The requirements set up for a fire test to demonstrate safe performance for a governmental agency requires that a pressure vessel be capable of operating within the temperature extremes of −65° F up to 200° F throughout the 10,000 or more cycles of pressurization and depressurization without any structural damage either to the pressure vessel, or to the newly designed thermal release valve 14. The governmental agency has specified that the pressure vessel must be capable of venting the contents, prior to exploding, which by testing has been demonstrated to be a bottle temperature of between 350° F and 375° F. It is necessary for the bottle to stay structurally sound in a flame or in a fire applied directly to the bottle to a temperature at least just above the 400° F range. It has been found that the fiber glass resin wound bottles will severely degrade at temperatures in excess of 400° F. Most fires do not emit a uniform temperature such as would be found in an oven. Instead, the fire can be much hotter in one place than in another, and for that reason pressure vessels of significant length have thermal relief valves 14 at each end thereof.

The alloy making up the slug of the valve must have high shear strength, such as described herein above, and, it has been found, that certain solder alloy compositions will satisfy the requirements. For instance, using a solder alloy designated SN62 of the Federal Specification QQ-S-571d, dated July 10, 1963, which has been approved by the Commissioner, Federal Supply Service, General Service Administration for use by all federal agencies. On page 4, under table 4, of said Federal Specification, the composition SN62 is set forth as containing 61.5 to 62.5 tin, 0.20 to 0.50 antimony, 0.25 bismuth; 1.75 to 2.25 silver; 0.08 copper; 0.02 iron; 0.005 zinc; 0.005 aluminum, and 0.03 arsenic, and shows a melting range for solidus of 350° F and liquidus of 372° F. Thermal valves 14 with SN62 alloy forming the pressure seal have been tested to a 99% confidence level. 44 thermal relief valves 14 using SN62 alloy slugs were randomly selected for the test. 14 of the valves were tested at a pressure of 5,000 psi in the following sequence:

first; 4 days at 200° F;
second; 14 days at 160° F;
third; 7 days at −65° F; and
fourth; 6 months at ambient temperature of approximately 60°–80° F.

All valves passed the test equivalent of a one-year average life with a 90% confidence level. This testing sequence was repeated for these 14 valves and a 99% confidence level was still maintained. Twenty-five of the 44 valves were tested to determine the effect of pressure cycling on the relieving of the temperature within the vessel. Five groups of these 25 valves were pressure cycled between the 0 to 5000 psi for 0 times, 500 times, 1000 times, 1500 times, or 2000 times; all passed the pressure cycling test without leakage. After the cycling test these same 25 valves were subjected to elevated temperatures while pressurized with all valves releasing pressure at temperatures between 324° and 394° F; with an average relief temperature of 362° F. The remaining 5 valves were subjected to pressure cycling between 0 and 5000 psi at standard temperature of about 60°–80° F. After 10,000 cycles the valves were tested for gas leaks and none were found to exist.

In prior known metal bottles, excessive pressure of the contents was vented by means of pressure relief valves. That is, the pressure of the contents builds up as a result of heating of the metal bottle, such as in a fire, whereupon a disc will rupture or a spring loaded seal will actuate as the pressure in the bottle reaches or exceeds a certain level. Our improved plug or valve would work just as well for standard metal bottles and would operate as a heat actuated relief device as distinguished from the present pressure actuated relief devices used on the metal bottles.

The alloy that is to be used to form the slug in the valve, must have certain specific properties. That is, the alloy of the valve must permit the valve to vent at the right temperatures, must be strong enough to hold from 5,000 to 20,000 pounds per square inch pressure, and cannot creep after long term storage, particularly under pressure. The alloys that have been found to be successful, have melting ranges with a solidus temperature of around 350° to 360° F. and with a liquidus temperature of between 360° and 380° F. These alloys are best used with steel plugs.

After the body of the valve has been drilled, the body is cleaned, vapor degreased, alkaline cleaned and heat dried at between 150° and 170° F. The parts should have the alloy cast in the openings within 12 hours. The alloy is preferably received in wire form and slugs of wire are cut to the desired length. The slugs of alloy and the openings in the body of the valve are fluxed with Allen's Tinning fluid which is a product of the L. B. Allen Company, Inc. of Schiller Park, ILL. The heads 32 of the body portion 30 are then put on a hot plate with the head 32 seated in a mating aperture 46 in a holding fixture 48 and are heated to a temperature of 560° F plus or minus 10° F, with the excessive flux being blown off. The body portion 30 is again put in the holding fixture 48 and heated until it reaches 560° F, plus or minus 10° F. Slugs of alloy are dropped into the shank opening 38 where the alloy will melt and flow in the channel in the portion 30. The body portion 30 is tapped gently to let the metal flow and the air escape. The opening 38 on the shank 34 of the body 30 is filled until it is flush or within 0.05 inches from the end of the shank 34. The holding fixture 48 is taken off the heat and permitted to cool until under 360° F whereupon the thermally actuated valves 14 can be removed and are ready for us.

When the valves 14 are used in filament wound pressure vessels of substantial length, one valve 14 is mounted in the metal cup 16 and one valve 14 is mounted in the metal neck 20 on the cap at the exit end of the pressure vessel 10. When the pressure vessel 10 is small, such as 6 inches in length or the like, only one relief valve 14 is necessary and that is generally mounted in the blank end 16 opposite to the exit end of the pressure vessel 10. The reason for locating the two valves 14 at spaced apart points on the larger pressure vessels is to allow for release of the pressure in the vessel when only one portion of the vessel is exposed to excessive flame or heat, i.e. it is possible for the bottom of the vessel to be subjected to a high temperature at the same time that the top of the vessel is in substantially normal temperature ranges, so that whichever end of the vessel exceeds the thermal release temperature of the valve first will be the valve that will vent the contents of the vessel in a safe and acceptable manner.

Pressure vessels of the fiber wound variety containing pressure relief valves of the type herein disclosed, have been tested by governmental agencies and have been found to meet all presently existent federal regulations and may be shipped in interstate commerce.

We claim:

1. A pressure release device for mounting on a metal element of a light weight fiber wound pressure vessel and for cooperating therewith, comprising:
    (a) a thermal release plug having a shank portion and a head portion, the shank portion mountable on the pressure vessel, the head portion open to the atmosphere;
    (b) a "T" shaped channel in the plug with the leg of the "T" positioned in the shank of the plug and communicating with the interior of the vessel, and the head of the "T" channel being substantially uniform in cross section, communicating with opposite sides of the head and being in cooperative relationship with the leg for providing a biforcated path to bleed the inside of the vessel;
    (c) a heat softening material bonded in the channel, the material having a melting point below the degradation temperature of the vessel and above the maximum ambient operating temperature of the vessel.

2. In a pressure release device as claimed in claim 1 wherein said material is an alloy having a solidus temperature within the range of 350° and 360° F and a liquidus temperature within the range of from 360° to 380° F.

3. A light weight fiber wound pressure vessel having an improved pressure release device, said device comprising:
    (a) a thermal release plug having a shank portion and a head portion, the shank portion mounted on the pressure vessel, the head portion open to the atmosphere;
    (b) a "T" shaped channel in the plug with the leg of the "T" positioned in the shank of the plug and communicating with the interior of the vessel, and the head of the "T" channel being substantially uniform in cross section, communicating with opposite sides of the head and being in cooperative relationship with the leg for providing a biforcated path to bleed the inside of the vessel;
    (c) a heat softening material bonded in the channel, the material having a melting point below the degradation temperature of the vessel and above the maximum ambient operating temperature of the vessel.

4. In a pressure release device as claimed in claim 3 wherein said pressure vessel has two metal elements and two thermal release devices, one of said elements is a metal cap and the other of said elements is a metal neck member, and one of said thermal release devices is mounted on said metal cap and the other of said thermal release devices is mounted on said neck member.

5. In a pressure release device as claimed in claim 3 wherein said degradation temperature of said pressure vessel is above 400° F and said maximum ambient operating temperature of the pressure vessel is below 200° F.

* * * * *